United States Patent

Buczek et al.

[15] 3,646,469
[45] Feb. 29, 1972

[54] TRAVELLING WAVE REGENERATIVE LASER AMPLIFIER

[72] Inventors: Carl J. Buczek, Manchester; Michael L. Skolnick, Monroe, both of Conn.

[73] Assignee: United Aircraft Corporation, East Hartford, Conn.

[22] Filed: Mar. 20, 1970

[21] Appl. No.: 21,320

[52] U.S. Cl. ........................331/94.5, 330/4.3, 356/106 LR
[51] Int. Cl. ........................................H01s 3/00, G01b 9/02
[58] Field of Search ..................356/106, 106 LR; 330/4.3; 331/94.5

[56] References Cited

UNITED STATES PATENTS 2,929,922  3/1960  Schawlow et al. ..................331/94.5
3,479,612  11/1969  Seidel ..................331/94.5

Primary Examiner—Ronald L. Wibert
Assistant Examiner—V. P. McGraw
Attorney—Melvin Pearson Williams

[57] ABSTRACT

A unidirectional travelling wave regenerative amplifier includes gain medium disposed in a travelling wave ring interferometer, the unidirectional travelling wave permitting coupling of a driving oscillator thereto without the amplifier feeding back to the oscillator. Because the amplifier is operated near saturation intensity, the output characteristic (with respect to frequency) is broadened; therefore, the output power and phase stability are relatively insensitive to variations in physical resonance. A hill climbing servo maintains the cavity of the ring interferometer at a length which relates precisely to the output frequency of the driving oscillator.

4 Claims, 2 Drawing Figures

INVENTORS
CARL J. BUCZEK
MICHAEL L. SKOLNICK
*Melvin Pearson Williams*
BY ATTORNEY 3,646,469

TRAVELLING WAVE REGENERATIVE LASER AMPLIFIER

BACKGROUND OF THE INVENTION

1. Field of Invention

This invention relates to lasers, and more particularly to an improved regenerative laser amplifier.

2. Description of the Prior Art

In the gas laser art, it is known that maximum power is extracted from a gain medium when the electromagnetic radiation, or optical flux, is at or near saturation intensity of the gain medium. It is also known that spectral quality of laser radiation, including the number of transition frequencies and the stability of transition frequencies, is more easily controlled in low-power oscillators than in high-power oscillators. Thus to achieve high-power laser radiation with high spectral quality, it has been known to combine a low-power oscillator with a high-power amplifier. However, in oscillator/amplifier configurations known to the prior art, the intensity of laser radiation as it enters the amplifiers is not saturation intensity for the amplifier, and therefore maximum power is not being extracted therefrom; instead, the intensity builds up as the radiation passes through the amplifier and becomes saturated at some point nearer to the outlet of the amplifier. On the other hand, if a large oscillator is used so that the amplifier is driven at full saturation even at its input, then the difficulty of creating and coupling spectrally pure and stable electromagnetic radiation from the oscillator becomes increasingly difficult.

SUMMARY OF THE INVENTION

The object of the present invention is to provide a fully saturated amplifier capable of being driven by a small, highly stable, spectrally pure oscillator.

In accordance with the present invention, a regenerative amplifier is operated near saturation intensity in response to an oscillator input of a much lower intensity. In accordance further with the invention, a travelling wave interferometer having gain medium in the optical path thereof is driven in a single direction of the ring by an oscillator having relatively low output power in comparison with the saturation power of the amplifier medium. According to the invention, the gain is adjusted with respect to the losses about the interferometer so that the net amplifier gain is just below the threshold required for oscillation; this provides substantially saturation intensity in the amplifier in response to a much smaller intensity of oscillator input thereto. In further accord with the present invention, a closed loop optical cavity length control system is utilized to maintain the resonant frequency of the ring interferometer regenerative amplifier at substantially the output frequency of the driving oscillator.

The present invention provides a convenient configuration of oscillator plus amplifier thus to achieve maximum efficiency in deriving useful laser radiation in a high-power amplifier, while having the attendant advantage of a highly stable, low-power driving oscillator. The invention is capable of incorporation of a variety of forms, and permits the high power and efficiency of saturated operation concurrently with spectral quality and controllability of low-power operation. Since the present invention is run with a gain below critical oscillation gain in the amplifier, a spectrally pure input beam will result in the spectrally pure output beam, there being generated no secondary emission at unwanted transition frequencies within the high gain area (the ring interferometer regenerative amplifier). Additionally, since the interferometer is operated as an amplifier, all of the mirrors therein may be flat mirrors and thus the cross-sectional area of radiation within the ring will be the same as that at the input to the ring; this allows the cross-sectional area to be determined by the parameters of the oscillator, or by the modification of the oscillator beam cross-sectional area by suitable well-known optical components. Thus, the cross-sectional area of radiation within the ring interferometer may be chosen to be optimal for the filling of the amplifier gain medium regions, and all of the excited gain medium can participate in the production of useful output. On the other hand, curved mirrors may be used if desired.

The foregoing and various other objects, features and advantages of the present invention will become more apparent in the light of the following detailed description of preferred embodiments thereof, as illustrated in the accompanying drawings.

DESCRIPTION OF THE PREFERRED EMBODIMENT

Figure 1:
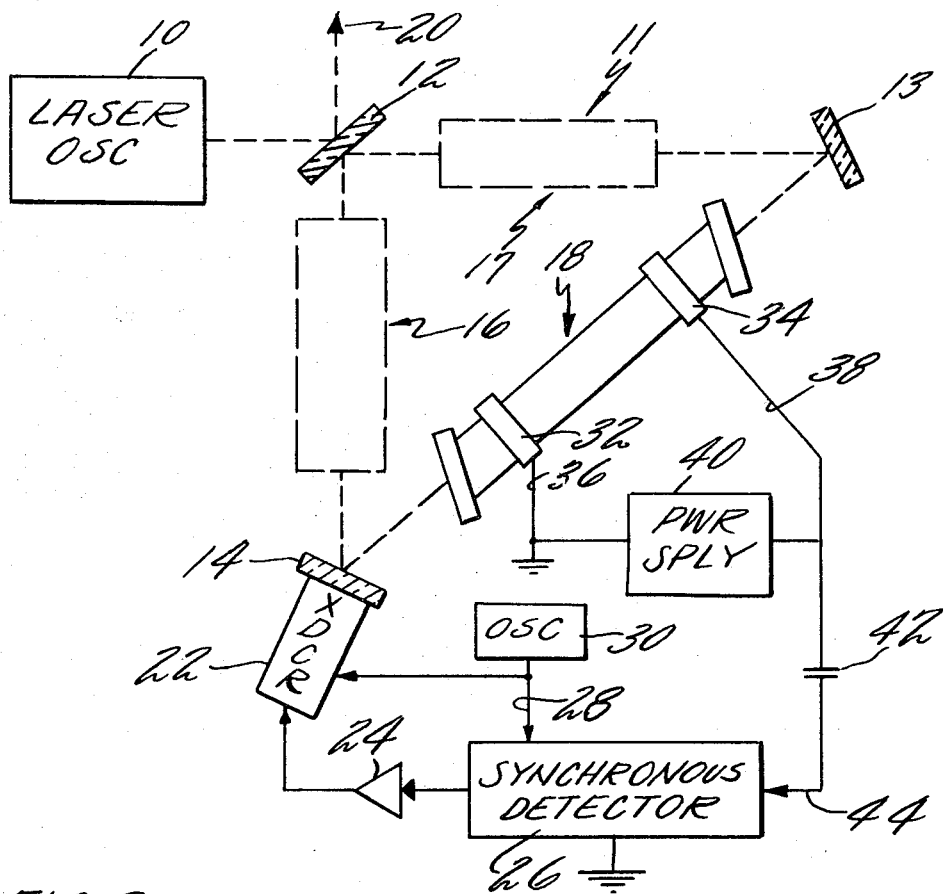
FIG. 1 is a simplified schematic block diagram of a reflective ring interferometer embodiment of the present invention employing only one transmissive mirror.

Referring now to FIG. 1, a preferred embodiment of the present invention includes a laser oscillator 10 which may be of any suitable well-known variety. In the example used herein, it is presumed that the laser oscillator is a $CO_2$ oscillator operating at about 10.6 microns. The maximum advantage of the present invention is derived when the oscillator is spectrally pure and has a closely controlled frequency. On the other hand, however, the present invention will work in response to oscillators of less sophistication, as desired. The ring interferometer regenerative amplifier 11 in accordance with the present invention is formed by a plurality of mirrors 12–14, the mirror 12 being partially transparent so as to receive into the ring interferometer the laser radiation output of the oscillator 10. Optical gain medium is included within the optical path of the ring interferometer; for instance, three different laser gain chambers 16–18 may be included as shown in FIG. 1, or a single laser chamber, such as the chamber 18 may be utilized if desired. In accordance with the invention, the gain of the laser gain chambers 16–18 is adjusted relative to the total losses in the amplifier 11 so that the gain will be just under the critical gain required for oscillation to occur. In practice, the gain is adjusted to be optimum for maximum output, thereby providing maximum gain; thereafter, the reflectivity of the mirrors is chosen to keep the net gain below the threshold necessary for oscillation. This guarantees that the amplifier is operating at near saturation intensity of the gain medium. In the embodiment shown in FIG. 1, the losses are those relating to the mirrors 12–14; absorption, scattering, defraction and so forth; as well as the power coupled from the amplifier through the mirror 12 (as indicated by an arrow 20). As so adjusted, any small amount of input radiation from the oscillator 10 through the mirror 12 will cause clockwise radiation only within the amplifier 11, and with the spacing of the mirrors 12–14 properly adjusted (as described hereinafter), the amplifier will be resonant and regenerative and therefore the small input radiation will build up to substantially near saturation intensity within the amplifier 11. Thus, a major objective of the present invention is achieved in that maximally efficient optical power generation is achieved by operating an amplifier at near saturation as a result of an input signal much less than saturation intensity of the amplifier.

As illustrated in FIG. 1, the resonance of the amplifier 11 may be adjusted by adjusting the position of the mirror 14 by means of a transducer 22 in response to a discriminant error signal supplied thereto by an amplifier 24 (which may include suitable filtering), generated at the output of a synchronous detector 26. The synchronous detector 26 has an oscillatory voltage applied to a reference input 28 from an oscillator 30, the oscillator also supplying a dithering voltage to the transducer 22. As a result of the dithering voltage supplied to the transducer 22, the resonant frequency of the cavity is dithered. Amplitude modulation of the laser output beam 20 results from varying the resonant frequency of the amplifier 11 around the center frequency of the oscillator on the amplifier gain c$rve. The amplitude modulation variation in the output beam 20 is monitored by sensing the concomitant variations which result therefrom in the impedance of the electric discharge plasma of one of the gain chambers 16–18, herein shown to be the gain chamber 18. A pair of electrodes 32, 34 include respective connections 36, 38 to a suitable high voltage, current regulated DC power supply 40, the electrodes and the power supply 40 being so chosen with respect to the gain medium so as to provide an electric discharge plasma within the gain chamber 18, whereby to provide for the excitation of upper laser levels of energy in the laser gain medium as a result of electron collisions, all as is well known in the art. With a constant current power supply 40, any change in the impedance within the plasma between the electrode 32, 34 results in a change of voltage therebetween, which change in voltage can be coupled by a capacitor 42 to a signal input 44 of the synchronous detector 26. Thus, as the output power 20 varies as a result of modulation of the resonant frequency of the amplifier 11, the capacitor 42 couples a concomitant variation in the voltage between the electrodes 32, 34 to the synchronous detector 26. The output of the synchronous detector 26 is an error voltage having a magnitude depending on the magnitude of voltage at the signal input 44, and a polarity depending upon the relative phase difference between the signal input 44 and the reference input 28. Thus, the voltage applied by the amplifier 24 to the transducer 22 tends to drive the transducer so as to move the mirror toward a position at which the resonant frequency of the amplifier 11 will coincide with the output frequency of the oscillator 10.

As is known, a $CO_2$ laser operated at any except the smallest of pressures tends to saturate homogeneously: that is, when the optical flux in the laser gain medium is near saturation intensity for the medium, the power output versus frequency curve is relatively flat. This is due to the fact that if the amplifier 11 is detuned slightly, then the power generation goes down slightly, but this in turn results in permitting higher gain since it is no longer at saturation intensity, so that the power output changes are relatively slight near the output frequency of the oscillator 10 for slight changes in cavity length of the amplifier 11. The net result is the broadening of the gain versus frequency characteristic of the amplifier 11. Because of the broadening of the frequency versus gain curve of the amplifier 11, minor instabilities in the resonant frequency of the oscillator will have very small, usually insignificant effects on the overall gain and performance of the amplifier 11.

In addition, because the gain medium is operated near saturation intensity, there is a broadening of phase versus resonant frequency characteristic of the amplifier 11. Thus, minor changes in the resonant frequency of the amplifier 11 result only in minor changes in the amplitude of the output and minor changes in the phase of the output, with substantially no change in output frequency. This contrasts with dithered frequency stabilized cavities known to the prior art wherein a substantial change in output frequency results from the dithering applied to the cavity. The reason for this is that the frequency of the output of the amplifier 11 will be substantially the frequency of the input radiation from the oscillator 10, the minor frequency variation resulting only from minor phase changing as a result of altering the cavity length of the amplifier 11.

The foregoing represents a preferred, reflective embodiment of the present invention utilizing only one mirror with transmissivity, the other two (or more mirrors) being fully reflective. Also, the oscillator input is coupled through the same mirror that couples the amplifier output.

Figure 2:
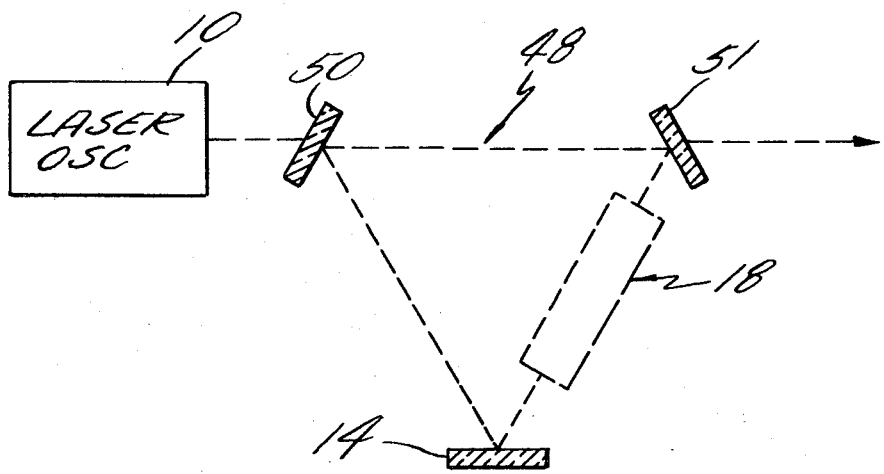
FIG. 2 is a simplified schematic diagram of a transmissive ring interferometer embodiment of the present invention employing two transmissive mirrors.

Alternative embodiments of the present invention may comprise a variety of configurations; one such is illustrated in FIG. 2 wherein an amplifier 48 comprises three mirrors 14, 50 and 51, both of the mirrors 50, 51 being partially transmissive, and the mirror 14 being fully reflective. In this case, the reflectivity of the mirrors 50, 51 has to be chosen to take into account the general losses throughout the system, the amount of output power which is to be coupled therefrom, the amount of input power applied thereto, and so forth. For instance, for a given value of gain, the percent of reflectivity of the mirrors 50, 51 is chosen so that regardless of the power input, the reflected input power at the mirror 50 destructively interferes with and is cancelled by an equal amount of power coupled to the mirror 50 from the mirror 14. Thus all of the radiation is in the clockwise direction, the suitable amount of radiation being coupled out through the mirror 51. Note that the embodiment of FIG. 2 utilizes but a single gain chamber although two or three gain chambers may be utilized if desired (as shown in FIG. 1). Similarly, although simplified in FIG. 2, the resonant frequency stabilizing closed loop system illustrated in FIG. 1 may be applied between the gain chamber 18 and the mirror 14 as shown in FIG. 1.

Although both the embodiments of FIG. 1 and FIG. 2 are illustrated in terms of three mirror ring interferometers, it should be understood that any number of mirrors may be utilized so as to provide a polygon suitable for any given utilization of the present invention. Similarly, the invention is described herein primarily in connection with a $CO_2$ laser since this laser readily adapts itself to high-power operation and is a preferred type of laser in current technology. However, provided the pressure of the laser gain medium is properly chosen with respect to the nature of the laser gain medium so as to provide a suitably flat frequency/gain characteristic, other gain mediums suitable to any given application of the present invention may be utilized in accordance with the skill of the art. Additionally, as is known in the art, instead of using totally reflecting mirrors, a suitable arrangement of prisms or gratings may be utilized so as to cause the optical path to close on itself, thereby providing a ring interferometer, a partially transmitting mirror being used where required to couple the input power in the output power from the amplifier. On the other hand, rather than utilizing partially transmitting mirrors, diffraction or other type coupling known in the art may be utilized to provide the input and output to and from the amplifier, in accordance with techniques known in the art. Further, other types of resonance adjusting servos may be used, such as those that monitor output flux, and others known in the art. Thus, although the invention has been shown and described with respect to preferred embodiments thereof, it should be understood by those skilled in the art that the foregoing and various other changes and omissions in the form and detail thereof may be made therein without departing from the spirit and the scope of the invention.

Having thus described typical embodiments of our invention, that which we claim as new and desire to secure by Letters Patent of the United States is:

1. A laser oscillator/amplifier combination comprising:
 a regenerative laser amplifier including means to provide a gain to losses relationship so that the net gain is just below the threshold for oscillation and including mans for coupling laser flux into and out of said amplifier;
 a laser oscillator providing output laser flux of an intensity substantially less than the saturation intensity of said regenerative laser amplifier but sufficient to drive said regenerative amplifier to near saturation intensity, said oscillator directing said output laser flux to said laser flux coupling means; and
 means for locking the resonant frequency of the amplifier to the frequency of the output laser flux of the oscillator.

2. A laser oscillator/amplifier combination according to claim 1 wherein said regenerative laser amplifier comprises a ring interferometer means having an optical path including an optical gain medium therein, said laser flux coupling means injecting flux from said oscillator into said ring interferometer in one direction only.

3. A laser oscillator/amplifier combination according to claim 2 wherein said ring interferometer comprises a partially transmissive mirror oriented at 45° to the output laser flux of said oscillator and optical path defining means for passing the laser flux output of said amplifier through said partially transmissive mirror perpendicular to the output laser flux of said oscillator.

4. A laser oscillator/amplifier combination according to claim 2 wherein said regenerative ring interferometer includes means providing adjustable resonance and further comprising means responsive to the magnitude of flux coupled out of said amplifier to adjust the resonance thereof to the frequency of the output laser flux from said oscillator.

* * * * *